United States Patent [19]

Rubin

[11] Patent Number: 4,954,949
[45] Date of Patent: Sep. 4, 1990

[54] UNIVERSAL CONNECTOR DEVICE FOR BUS NETWORKS IN HOST COMPUTER/CO-PROCESSOR COMPUTER SYSTEM

[75] Inventor: Henri Rubin, King of Prussia, Pa.

[73] Assignee: Commodore-Amiga, Inc., West Chester, Pa.

[21] Appl. No.: 415,469

[22] Filed: Oct. 2, 1989

Related U.S. Application Data

[63] Continuation of Ser. No. 152,954, Feb. 5, 1988, abandoned.

[51] Int. Cl.$^5$ .............................................. G06F 13/00
[52] U.S. Cl. ........................................ 364/200; 361/412
[58] Field of Search ............... 364/200, 900; 361/397, 361/400, 407, 412, 413, 414

[56] References Cited

U.S. PATENT DOCUMENTS

| | | | |
|---|---|---|---|
| 3,993,935 | 11/1976 | Phillips et al. | 361/397 |
| 4,490,775 | 12/1984 | Quan | 361/400 X |
| 4,598,336 | 7/1986 | Hehl | 361/413 X |
| 4,647,123 | 3/1987 | Chin et al. | 361/413 X |
| 4,679,121 | 7/1987 | Schomers et al. | 361/413 |

Primary Examiner—David L. Clark

[57] ABSTRACT

A connector device for use in communication of data between the central processing unit (CPU) bus of a host computer system and the CPU bus of a co-processor computer system, between the CPU bus of the host computer system and an expansion card used with the host computer system, and between the CPU bus of the co-processor computer system and an expansion card used with the co-processor computer system using a bridge card includes a plurality of host computer system expansion slots and a plurality of co-processor computer system expansion slots configured so that at least one host computer system expansion slot and at least one co-processor computer system expansion slot form an in-line pair to accept the bridge card.

6 Claims, 3 Drawing Sheets

UNIVERSAL CONNECTOR DEVICE FOR BUS NETWORKS IN HOST COMPUTER/CO-PROCESSOR COMPUTER SYSTEM

This application is a continuation of application Ser. No. 152,954, filed Feb. 5, 1988, now abandoned.

BACKGROUND OF THE INVENTION

1. Field of the Invention

The present invention relates, in general, to microprocessor controlled video games and personal computers and to the communication between the central processing unit ("CPU") of a host computer system and that of a co-processor computer system to provide application software capability. More particularly, the present invention relates to a connector device used in such a host/co-processor computer system.

2. Description of Related Art

As fully set forth in co pending U.S. patent application Ser. No. 041,533 entitled "A Method Of Communicating Data Between The CPU Of A Host Computer System And The CPU Of A Co-Processor Computer System," filed Apr. 23, 1987, and assigned to the assignee of this application, which co-pending application is hereby incorporated by reference, there is a great need for a method for allowing application software from a normally noncompatible computer system to be utilized by a host computer system.

In the co-pending application, apparatus and methods are provided to accomplish high speed communication of data between the CPU of a host computer system and the CPU of a co-processor computer system which processes application software which is not compatible with the host computer system. A specific example is illustrated in the co-pending application by the Amiga computer system designed, manufactured, and marketed by Commodore Business Machines, Inc. of West Chester, Pennsylvania.

The Amiga system is a low-cost, high performance computer with advanced graphics features, sound features, and high speed performance. However, the Amiga system is not IBM-PC/XT or IBM-PC/AT ("PC") compatible and, thus, cannot use the library of PC application software which is readily available on the market. In the specific illustration of the co-pending application, means are disclosed for making the Amiga system, as the host computer system, PC compatible. The invention disclosed and claimed in that application, as well as the invention disclosed and claimed herein, are not limited to an Amiga/PC environment, however. That environment is merely presented as a specific, preferred environment for purposes of explanation.

As diagramatically illustrated in FIG. 7 of the co-pending application, which diagram is reproduced here as FIG. 1 with the 100 pin expansion Amiga bus slots 20 being renumbered 20(1), 20(2), 20(3), 20(4), and 20(5), a PC compatibility system 78 is added to host computer system 66 (that is, the Amiga system) for enhancing the host computer system to allow the host system to be compatible with PC application software. PC compatibility system 78 includes a dual port random access memory ("DPRAM") 76 and a co-processor system 70 which includes hardware (such as an 8088 CPU 54) and software necessary to create a PC environment and also includes PC application software to run in that environment. DPRAM 76 is connected on one port to the Amiga bus via one of the 100 pin expansion Amiga bus slots 20 and is connected on another port to the CPU bus of co-processor system 70.

As diagramatically illustrated in FIG. 2, PC compatibility system 78 can readily be mounted on a plug-in card called a "bridge card". Bridge card 200 includes a 100 pin host computer system CPU bus connector 202 connected to DPRAM 76 and a 62 pin co-processor system CPU bus connector 204 connected to the CPU bus of co-processor system 70 for an IBM PC/XT compatibility system. To add PC compatibility system to the host computer system 66, host computer system CPU bus connector 202 of bridge card 200 can be plugged into the Amiga bus at one of the 100 pin expansion Amiga bus slots 20(1), 20(2), 20(3), 20(4), and 20(5) shown in FIG. 1. As discussed below, co-processor computer system CPU bus connector 204 can be used to allow expansion cards to be utilized in the PC environment created by co-processor computer system 70.

In the above described host computer system and its PC compatibility enhancement, there is a need for a connector device that provides easy connection of the PC compatibility system to the CPU of the host computer system and to expansion slots on that bus and provides easy connection of the CPU bus of the co-processor computer system to expansion slots for the use of expansion cards in the PC environment created by the co-processor system. There is also a need for such a connector device that provides flexibility in the number of expansion slots available on the host computer system side of the PC compatibility system and those on the PC side of the system and provides easy access to those expansion slots.

It is, thus, an object of the invention to provide a connector device that allows easy connection of the PC compatibility system to the CPU of the host computer system and to expansion slots on that bus and to provide easy connection of the CPU bus of the co-processor computer system to expansion slots for use of expansion cards in the PC environment.

Another object of the invention is to provide a connector device which offers flexibility in the number of expansion slots available on the both sides of the PC compatibility system and allows easy access to those expansion slots.

Still another object of the invention is to provide a connector device which readily accepts a bridge card and expansion cards.

Yet another object of the invention is to provide a connector device which readily accepts a bridge card in more than one slot while also accepting expansion cards.

A further object of the invention is to provide a connector device that is simple in construction and easy to manufacture.

Other objects and features of the invention will further become apparent with reference to the accompanying drawings and the detailed description of the invention or may be learned by practice of the invention.

SUMMARY OF THE INVENTION

To achieve the foregoing objects and in accordance with the purpose of the invention, as embodied and broadly described herein, a connector device is provided for use in communication of data between the CPU bus of a host computer system and the CPU bus of a co-processor computer system, between the CPU bus of the host computer system and an expansion card used with the host computer system, and between the CPU bus of the co-processor computer system and an expansion card used with the co-processor computer system using a bridge card having a host computer system CPU bus connector and a co-processor computer system CPU bus connector. The connector device comprises a plurality of host computer system expansion slots for coupling to the CPU bus of the host computer system; and a plurality of co-processor computer system expansion slots for coupling to the CPU bus of the co-processor computer system, wherein the plurality of host computer system expansion slots and the plurality of co-processor computer system expansion slots are physically configured so that a host computer system expansion slot and a co-processor computer system expansion slot form an in-line pair to accept the host computer system CPU bus connector of the bridge card in the host computer system expansion slot and the co processor computer system CPU bus connector of the bridge card in the co-processor computer system expansion slot.

In the connector device, the plurality of host computer expansion slots can include a first host computer expansion slot and a second host computer expansion slot and the plurality of co-processor computer expansion slots can include a first co-processor computer system expansion slot and a second co-processor computer system expansion slot. The first host computer system expansion slot and the first co-processor computer expansion slot form a first in-line pair to accept the host computer system CPU bus connector and the co-processor computer system CPU bus connector of the bridge card, and the second host computer system expansion slot and the second co-processor computer expansion slot form a second in-line pair to accept the host computer system CPU bus connector and the co-processor computer system CPU bus connector of the bridge card.

BRIEF DESCRIPTION OF THE DRAWINGS

The accompanying drawings, which are incorporated in and constitute a part of the specification, illustrate a preferred embodiment of the invention and, together with the description, serve to explain the principals of the invention.

Of the drawings.

DESCRIPTION OF THE PREFERRED EMBODIMENT

Figure 1:
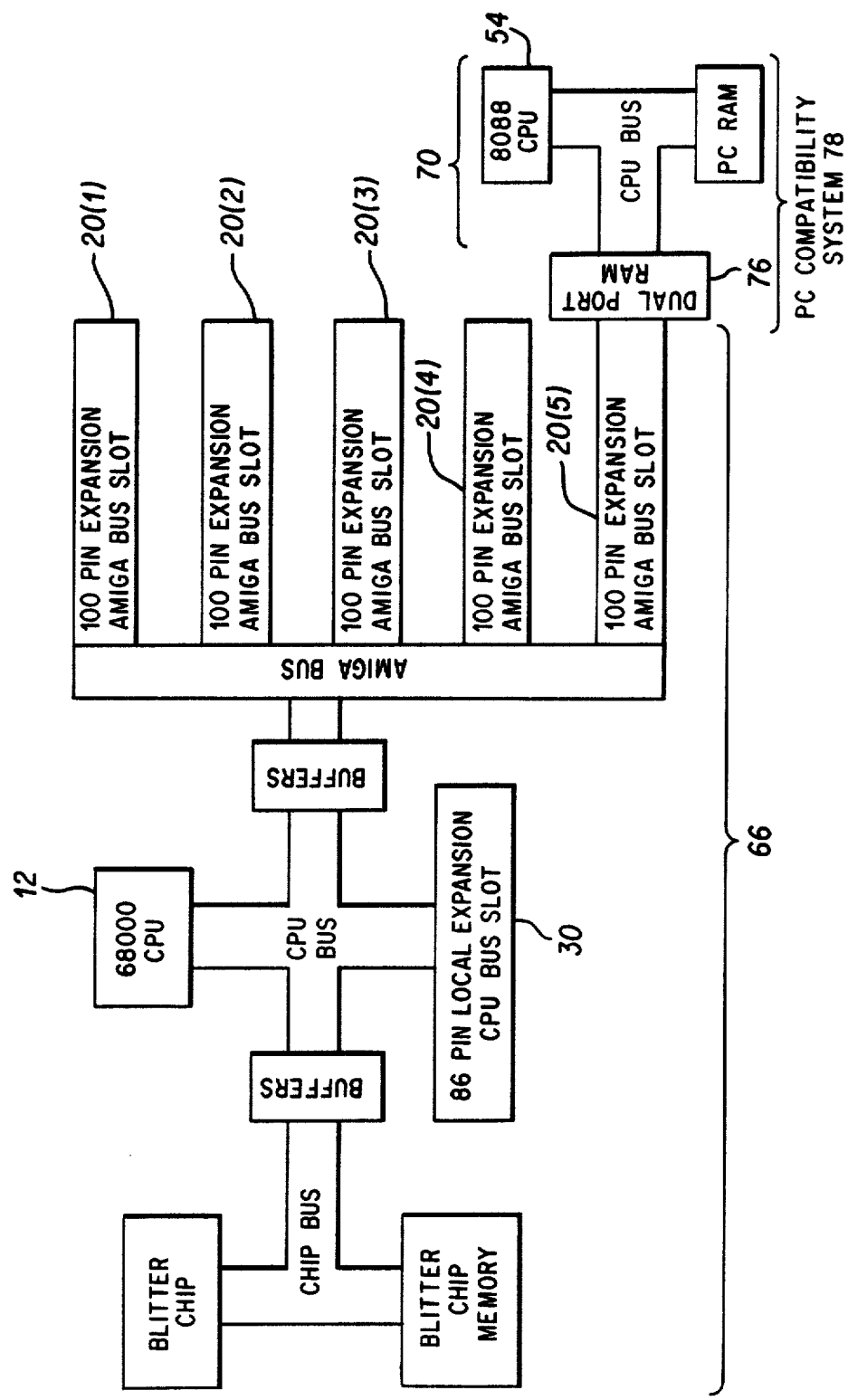
FIG. 1 is a block diagram of the Amiga system with the PC compatibility system in place.
Figure 2:
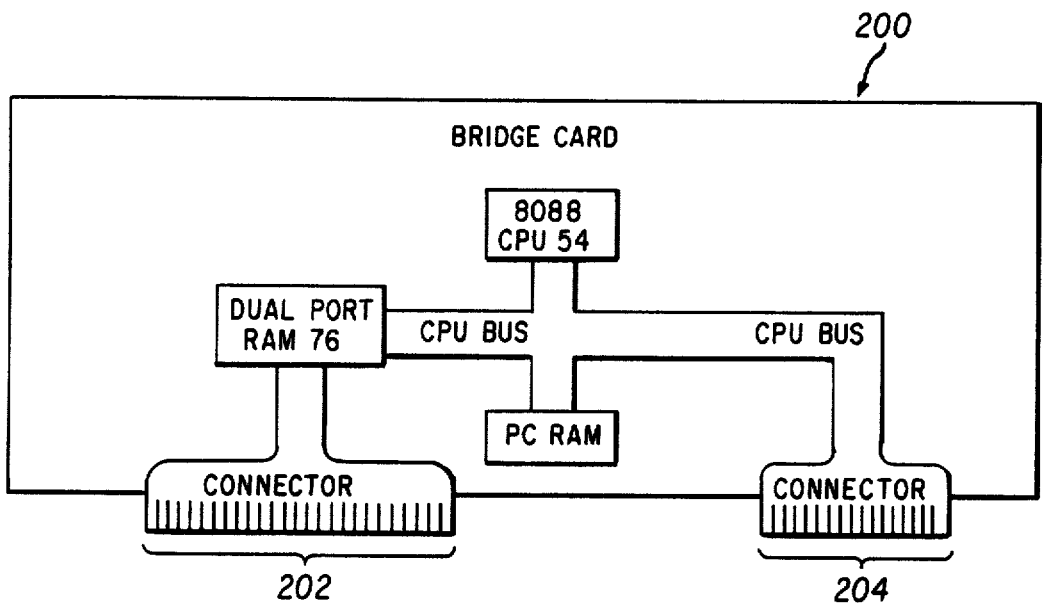
FIG. 2 is a block diagram of a PC compatibility system in the form of a plug-in card called a "bridge card"
Figure 3:
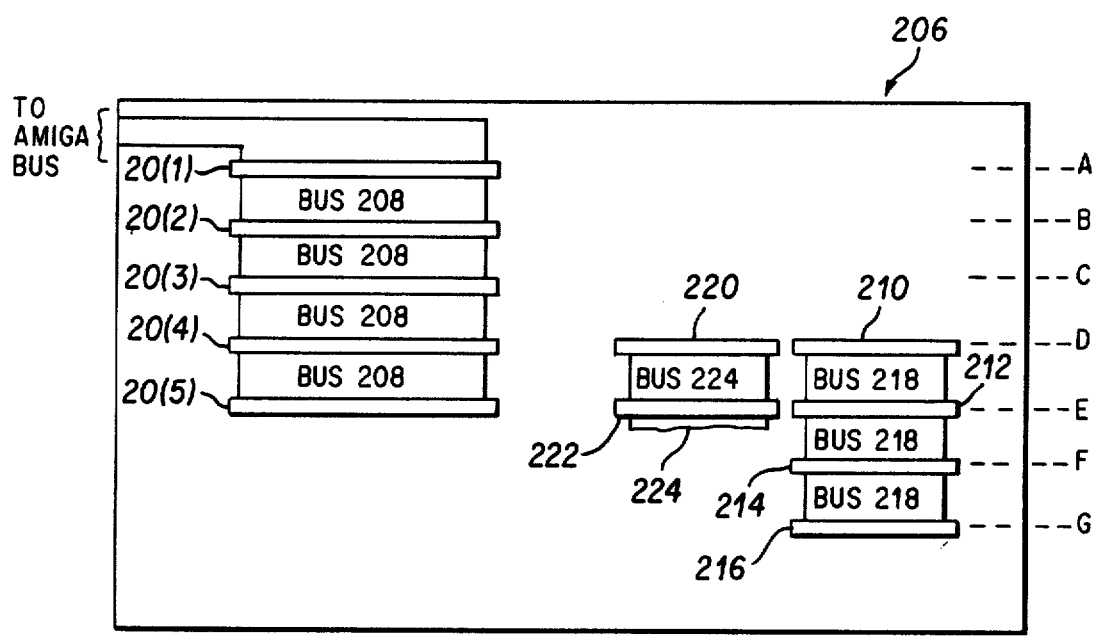
FIG. 3 is a top view of a preferred embodiment of the connector device invention.

Referring again to the drawings, wherein like referenced characters designate like or corresponding parts throughout the several drawings, there is shown in FIG. 3 a connector device 206 for use in communication of data between the CPU bus of host computer 66 and the CPU bus of co-processor computer system 70, between the host CPU bus and an expansion card used with host computer system 66, and between the CPU bus of co-processor computer system 70 and an expansion card used with system 70 using bridge card 200.

Connector 206 includes a plurality of host computer system expansion slots or connectors, for example, slots 20(1), 20(2), 20(3), 20(4), and 20(5) which are coupled to the Amiga CPU bus when connector 206 is installed in a cabinet containing the Amiga system. The individual expansion slots are electrically connected by bus 208 which is coupled to the Amiga CPU bus. Expansion slots 20(1-5) are each configured to accept a standard plug-in expansion card (not illustrated) for the Amiga computer system, such as an Amiga modem board, A2090 HD/SCSI controller, or A2052 RAM board, and to accept connector 202 from bridge card 200. Expansion slots 20(1-5) electrically connect expansion cards and DPRAM 76 to the Amiga CPU bus.

Connector 206 also includes a plurality of co-processor computer system expansion slots, for example, IBM-PC/XT I/0 expansion slots 210, 212, 214, and 216. The individual expansion slots are electrically connected by bus 218 which can serve as an extension of the CPU bus of co-processor computer system 70. PC expansion slots 210-216 are each configured to accept a standard plug-in PC card, such as network interfaces, SDLC/BSC communication cards, modem cards, clock/calendar cards, and others, which can be used by co-processor computer system 70. Each of PC expansion slots 210-216 also accepts connector 204 from bridge card 200 to electrically connect bus 218 to the CPU bus of co-processor computer system 70.

The plurality of host computer system expansion slots and the plurality of co-processor computer system expansion slots are physically configured on connector 206 so that at least one host computer system expansion slot and at least one co-processor computer system expansion slot form an in-line pair to accept the host computer system CPU bus connector of the bridge card in the host computer system expansion slot and the co-processor computer system CPU bus connector of the bridge card in the co-processor computer system expansion slot. Specifically, in the preferred embodiment illustrated in FIG. 3, host computer system expansion slot 20(4) is separated from and aligned with co-processor computer system expansion slot 210 so that slots 20(4) and 210 form an in-line pair which allows bridge card 200 to be plugged into connector 206 by the insertion of connector 202 into slot 20(4) and connector 204 into slot 210 at board position D. Moreover, in the preferred embodiment of FIG. 3, expansion slot 20(5) and expansion slot 212 are situated to form another in-line pair to accept bridge card 200 in board position E. As also illustrated in FIG. 3, each of expansion slots 20(1) through 20(5) are parallel to each other as are expansion slots 210, 212, 214, and 216.

Connector 206 can also include another plurality of co-processor computer system expansion slots or connectors, such as expansion slots 220 and 222 coupled by bus 224. Only two such slots are shown in FIG. 3; however, additional slots can be included in connector 206 and connected by bus 224. In the preferred embodiment, slot 220 when used with slot 210 creates an IBM PC/AT I/0 slot. Similarly slots 222 and 212 form another IBM PC/AT I/0 slot. The bridge card used with expansion slots 210 and 212 extended by slots 220 and 222 would, of course, have to be modified to create an IBM-PC/AT environment and would have a 98 pin co-processor computer system CPU bus connector instead of the 62 pin bus connector 204 used in an IBM-PC/XT co-processor computer system of bridge card 200. The IBM-PC/AT bus connector on the bridge card would be spaced from host computer system CPU bus connector 202 to allow connector 202 to be inserted in slot 20(4) or 20(5) while the IBM-PC/AT connector is in slots 220 and 210 or 222 and 212, respectively.

Figure 4:
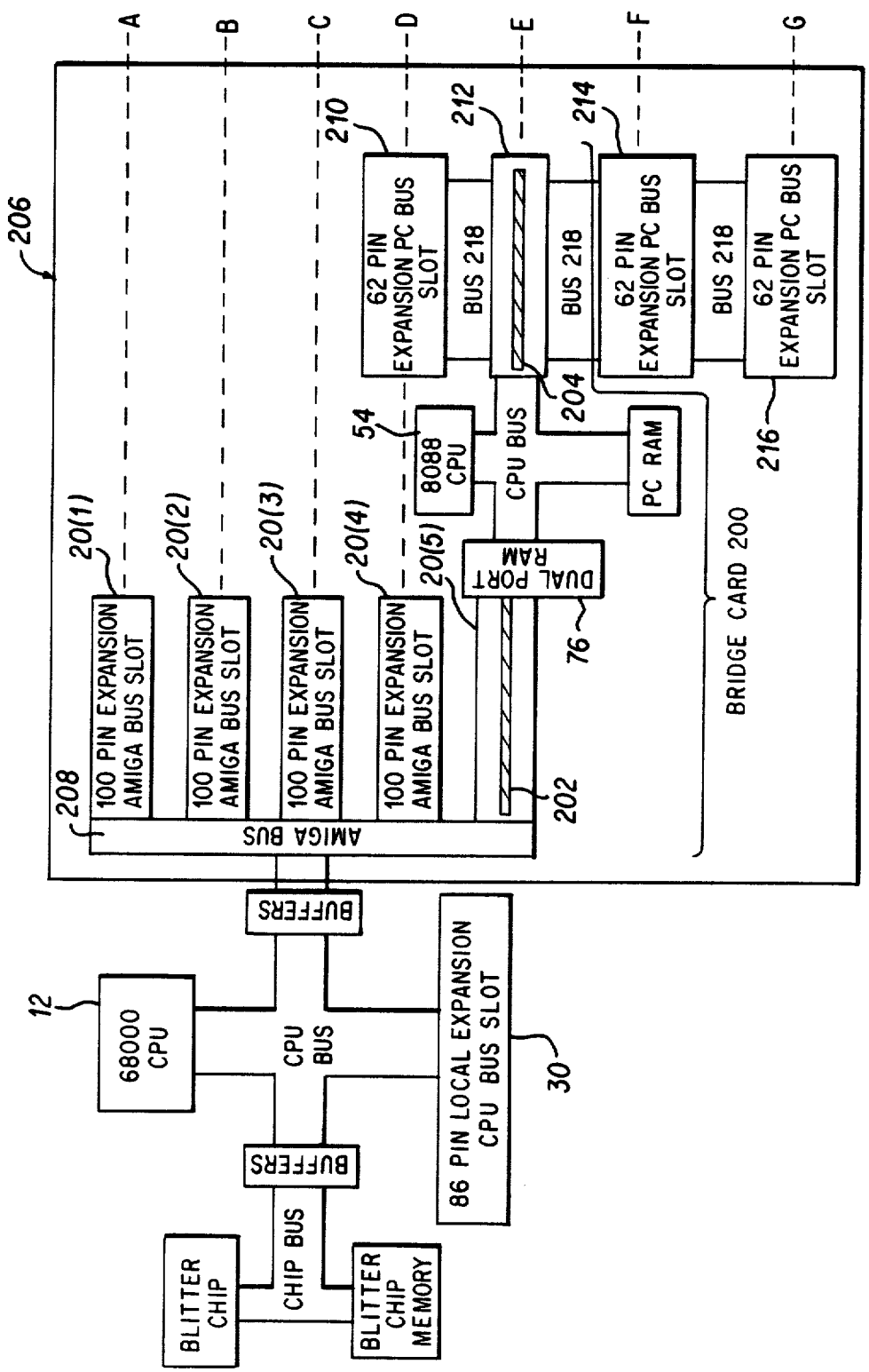
FIG. 4 is a block diagram of the preferred embodiment of the invention shown in FIG. 3 as used in the Amiga system of FIG. 1.

As configured, the preferred embodiment of connector 206 illustrated in FIG. 3 provides seven board positions A, B, C, D, E, F, and G to allow connection of expansion cards for the host computer system, expansion cards for the co-processor computer system, and a bridge card. Bridge card 200 can be placed in either board position D or board position E as discussed above depending upon the needs of the computer's user. Placement of bridge card 200 in board position E, as diagramatically illustrated in FIG. 4, provides access to four out of the five host computer system expansion slots. Specifically, that positioning of bridge card 200 allows the plug-in of expansion cards for the Amiga system at expansion slots 20(1), 20(2), 20(3), and 20(4) at board positions A, B, C, and D, respectively. That positioning, however, reduces availability of PC expansion slots to slots 214 and 216 at board positions F and G, respectively.

If more expansion slots are needed by the computer user on the co-processor computer system, then bridge card 200 can be inserted at board position D. This plug-in position allows use of board positions E, F, and G for expansion slots 212, 214, and 216, respectively. This positioning of bridge card 200 allows expansion card placement in board positions A, B, and C for the host computer system expansion slots 20(1), 20(2), and 20(3). Similar considerations must be made when using a bridge card adapted for plugging into the in-line pair consisting of expansion slot 20(4) and expansion slots 220 and 210 and into the in-line pair consisting of expansion slot 20(5) and expansion slots 222 and 212 (that is, board positions D and E, respectively, for the IBM PC/AT environment). Note that expansion slots 220 and 222 and bus 224 are not shown in FIG. 4.

Connector 206 provides the computer user with great flexibility. The computer user can use board positions A-E for expansion cards in the host computer system or can make the host computer system PC compatible by plugging in bridge card 200 in either board position D or E. Connector 206 allows the computer user to choose a number of options with respect to the number of expansion cards for use on the host computer system and for use in the co-processor computer system. In the preferred embodiment of FIG. 3, when using bridge card 200 and connector 206, the computer user has available either three board positions for expansion cards on the host computer system side and three on the co-processor computer system side, that is, board positions A, B, and C and E, F, and G, respectively, or four positions on the host computer system side and two on the co-processor computer system side, that is, board positions A, B, C, and D and board positions F and G, respectively.

In operation, the computer user utilizes connector 206 by inserting expansion cards for the host computer system, a bridge card, and/or expansion cards for the co-processor computer system by plugging the appropriate bus connectors on the cards into the appropriate slots on connector 206 in a conventional manner.

It will be apparent to those skilled in the art that various modifications and variations can be made in the conductor device of the present invention without departing from the scope or spirit of the invention. For example, the number of host computer system expansion slots can be increased or decreased as well as those of the co processor computer system expansion slots. Additional co-processor computer system slots can be added in line with one or more of the host computer system expansion slots to provide the plugging in of additional types of bridge cards. Thus, it is intended that the present invention cover the modifications and variations of this invention provided they come within the scope of the appended claims and their equivalents.

What is claimed:

1. A connector device for use in communication of data between the central processing unit (CPU) bus of a host computer system which bus consists of a plurality of continuous electrical conductors and the CPU bus of a first or a second co-processor computer system which bus consists of a plurality of continuous electrical conductors, between the CPU bus of the host computer system and one or more expansion cards used with the host computer system, and between the CPU bus of the first or second co-processor computer system and one or more expansion cards used with the first or second co-processor computer system using a bridge card having a host computer system CPU bus connector and a co-processor computer system CPU bus connector, the connector device comprising:

a plurality of host computer system expansion slots electrically coupled to the continuous electrical conductors of the CPU bus of the host computer system, each of the host computer system expansion slots extending along a first direction and being spaced from each other along a second direction;

a first plurality of co-processor computer system expansion slots electrically coupled to the continuous electrical conductors of the CPU bus of the first co-processor computer system, each of the first plurality of co-processor computer system expansion slots extending along the first direction and being spaced from each other along the second direction, wherein the plurality of host computer system expansion slots and the first plurality of co-processor computer system expansion slots are spaced from each other in the first direction and partially offset from each other in the second direction to form an in-line pair in the first direction from at least one of the plurality of host computer system expansion slots and at least one of the first plurality of co-processor computer system expansion slots to accept simultaneously (1) the host computer system CPU bus connector and the co-processor computer system CPU bus connector of the bridge card in the in-line pair, (2) a host computer system expansion card in a host computer system expansion slot, and (3) a co-processor computer system expansion card in a co-processor computer system expansion slot; and a second plurality of co-processor computer system expansion slots spaced from the first plurality of co-processor computer system expansion slots and electrically coupled to continuous electrical conductors of a CPU bus of the second co-processor computer system when used with the first plurality of co-processor computer system expansion slots wherein at least one of the plurality of host computer system expansion slots, at least one of the first plurality of co-processor computer system expansion slots, and at least one of the second plurality of co-processor computer system expansion slots form an in-line configuration in the first direction.

2. The connector device of claim 1 wherein the plurality of host computer expansion slots includes a first host computer expansion slot and a second host computer expansion slot; the first plurality of co-processor computer expansion slots includes a first co-processor computer system expansion slot and a second co-processor computer system expansion slot; and the first host computer system expansion slot and the first co-processor computer expansion slot form a first in-line pair to accept the host computer system CPU bus connector and the co-processor computer system CPU bus connector of the bridge card and the second host computer system expansion slot and the second co-processor computer expansion slot form a second in-line pair to accept the host computer system CPU bus connector and the co-processor computer system CPU bus connector of the bridge card.

3. The connector device of claim 2 wherein the first in-line pair is parallel to the second in-line pair.

4. The connector device of claim 2 wherein the first and second in-line pairs are adjacent each other.

5. The connector device of claim 1 wherein
each of the plurality of host computer system expansion slots is parallel to one another; and
each of the first plurality of co-processor computer system expansion slots is parallel to one another.

6. The connector device of claim 1 wherein the second direction is perpendicular to the first direction.

* * * * *